United States Patent
Wang et al.

(10) Patent No.: US 9,979,453 B2
(45) Date of Patent: May 22, 2018

(54) METHODS AND APPARATUSES FOR RECEIVING AND SENDING REFERENCE SIGNAL, USER EQUIPMENT, AND BASE STATION

(71) Applicant: HUAWEI TECHNOLOGIES CO., LTD., Shenzhen (CN)

(72) Inventors: Jianguo Wang, Bonn (DE); Yongxing Zhou, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 14/872,427

(22) Filed: Oct. 1, 2015

(65) Prior Publication Data

US 2016/0028463 A1    Jan. 28, 2016

Related U.S. Application Data

(63) Continuation of application No. PCT/CN2013/073727, filed on Apr. 3, 2013.

(51) Int. Cl.
   *H04B 7/06* (2006.01)
   *H04B 7/0452* (2017.01)
   (Continued)

(52) U.S. Cl.
   CPC ........... *H04B 7/0619* (2013.01); *H04B 7/024* (2013.01); *H04B 7/0452* (2013.01);
   (Continued)

(58) Field of Classification Search
   CPC ..... H04B 7/0452; H04B 7/0691; H04B 7/024
   See application file for complete search history.

(56) References Cited

U.S. PATENT DOCUMENTS

2011/0158191 A1   6/2011  Zhang et al.
2012/0176939 A1*  7/2012  Qu .................. H04L 5/0023
                                                         370/255
(Continued)

FOREIGN PATENT DOCUMENTS

CN        101340228      1/2009
CN        101771443      7/2010
(Continued)

OTHER PUBLICATIONS

International Search Report dated Jan. 2, 2014 in corresponding International Application No. PCT/CN2013/073727.
(Continued)

*Primary Examiner* — Christopher Crutchfield
(74) *Attorney, Agent, or Firm* — Staas & Halsey LLP

(57) ABSTRACT

Embodiments of the present invention relate to methods and apparatuses for receiving and sending a reference signal, user equipment, and a base station. A method for receiving a reference signal includes: receiving resource configuration information of a reference signal, where the resource configuration information of the reference signal includes information about an antenna port configuration and a reference signal subframe configuration, the antenna port configuration indicates an antenna port structure, and the reference signal subframe configuration indicates a reference signal subframe for sending the reference signal on one or more antenna port groups; and receiving the reference signal according to the resource configuration information of the reference signal. In the embodiments of the present invention, a communications system can adapt to an antenna array structure and more antenna port quantity configurations, which is used for cell selection or MCS selection and scheduling, thereby improving a system throughput.

16 Claims, 4 Drawing Sheets

(51) Int. Cl.
*H04B 7/024* (2017.01)
*H04L 5/00* (2006.01)
*H04W 72/04* (2009.01)

(52) U.S. Cl.
CPC ........... *H04B 7/0691* (2013.01); *H04L 5/006* (2013.01); *H04L 5/0023* (2013.01); *H04L 5/0046* (2013.01); *H04L 5/0048* (2013.01); *H04W 72/0446* (2013.01); *H04L 5/0035* (2013.01); *H04L 5/0094* (2013.01)

(56) References Cited

U.S. PATENT DOCUMENTS

| | | | | |
|---|---|---|---|---|
| 2012/0281567 | A1* | 11/2012 | Gao | H04B 7/0626 370/252 |
| 2013/0031991 | A1* | 2/2013 | Singh | F16H 3/006 74/330 |
| 2013/0258964 | A1* | 10/2013 | Nam | H04W 72/046 370/329 |
| 2013/0286849 | A1* | 10/2013 | Park | H04B 7/024 370/241 |
| 2014/0126476 | A1* | 5/2014 | Kang | H04L 1/0026 370/328 |
| 2014/0192762 | A1 | 7/2014 | Li et al. | |
| 2015/0208397 | A1 | 7/2015 | Lee et al. | |

FOREIGN PATENT DOCUMENTS

| | | |
|---|---|---|
| CN | 102315871 | 1/2012 |
| CN | 102696179 | 9/2012 |
| CN | 102823168 | 12/2012 |
| CN | 102938688 | 2/2013 |
| WO | WO2011119005 | 9/2011 |
| WO | 2012/092881 A1 | 7/2012 |
| WO | WO2012169816 | 12/2012 |
| WO | 2013/024350 | 2/2013 |

OTHER PUBLICATIONS

Extended European Search Report dated Feb. 17, 2016 in corresponding European Application No. 13881274.8.
"Discussion on 3D Antenna Model with 2D Antenna Array", 3GPP TSG RAN WG1 Meeting #72, R1-130026, St. Julian's, Malta, Jan. 28-Feb. 1, 2013, 6 pages.
Notice of Reasons for Rejection, dated Sep. 27, 2016, in Japanese Application No. 2016-505672 (11 pp.).
PCT International Search Report dated Jan. 2, 2014 in corresponding International Patent Application No. PCT/CN2013/073727.
Korean Office Action dated Jan. 10, 2017 in corresponding Korean Patent Application No. 10-2015-7029954.
"Extension of the new antenna model to a 2D antenna array", 3GPP TSG-RAN WG4 Meeting #63, R4-122355, $3^{rd}$ Generation Partnership Project, Prague, Tchechien, May 21-25, 2012, pp. 1-7.
"Views on 3D channel modelling", 3GPP TSG-RAN WG1 #72, R1-130090, $3^{rd}$ Generation Partnership Project, St. Julian's, Malta, Jan. 28-Feb. 1, 2013, pp. 1-9.
Chinese Office Action dated Jul. 19, 2017 in corresponding Chinese Patent Application No. 201380004527.5, 8 pages.
Chinese Search Report dated Jul. 11, 2017 in corresponding Chinese Patent Application No. 2013800045275, 2 pages.
Japanese Office Action dated May 9, 2017 in corresponding Japanese Patent Application No. 2016-505672, 5 pages.

\* cited by examiner

METHODS AND APPARATUSES FOR RECEIVING AND SENDING REFERENCE SIGNAL, USER EQUIPMENT, AND BASE STATION

CROSS-REFERENCE TO RELATED APPLICATIONS

This application is a continuation of International Application No. PCT/CN 2013/073727, filed on Apr. 3, 2013, which is hereby incorporated by reference in its entirety.

TECHNICAL FIELD

Embodiments of the present invention relate to the communications field, and in particular, to methods and apparatuses for receiving and sending a reference signal, user equipment, and a base station.

BACKGROUND

Reference signals may generally be classified into two types: one type is used for measuring a channel state or measuring channel quality, so as to implement scheduling; the other type is used for performing coherent demodulation on a receive signal including control information or data information. For example, a reference signal used for coherent demodulation is referred to as a demodulation reference signal (DMRS), and the reference signal is also referred to as a user equipment (UE)-specific reference signal (UE-specific reference signal), and is used for performing channel estimation when a physical downlink shared channel (PDSCH) is demodulated; a reference signal used for measuring channel state information is referred to as a channel state information reference signal (CSI-RS), which is especially used in a situation in which multi-antenna transmission is performed. A rank indicator (RI), a pre-coding matrix indicator (PMI), a channel quality indicator (CQI), and other feedback information may be derived from channel measurement based on a CSI-RS. A cell specific reference signal (CRS) may be used for UE channel estimation, so as to implement demodulation of a physical downlink control channel (PDCCH) and another common channel. In addition, the CRS may be further used for measuring channel quality, such as reference signal received power (RSRP) and reference signal received quality (RSRQ), so as to implement a function such as cell selection.

Multiple antennas are widely used in a modern communications system, so as to increase capacity and coverage of a system or improve user experience. For example, a Long Term Evolution (LTE) R8 system can support four antenna ports, and LTE R10 to R11 systems can support eight antenna ports. Each antenna port may correspond to one physical antenna or one virtual antenna, where the virtual antenna is a weighted combination of multiple physical antennas. The communications system may obtain channel estimation associated with each antenna port by using a pilot signal or a reference signal.

In order to further improve spectral efficiency, more antenna configurations, such as an antenna configuration based on an active antenna system (AAS), are introduced. An AAS base station further provides a vertical design of a freedom degree of an antenna, and therefore, the AAS base station can be implemented by using horizontal and vertical two-dimensional antenna arrays thereof. For the AAS base station, even though quantities of antenna ports are the same, antenna array structures may be different. For example, sixteen antenna ports may be implemented by using a 2×8 antenna array, or may be implemented by using a 4×4 antenna array. Therefore, for antenna ports having same numbers, different channel state measurements may also be obtained in different array structures.

In the prior art, multiple solutions for acquiring a transmit antenna port quantity configuration are provided. However, because information about the configuration is actually specific to a design of a horizontal antenna array, the information about the configuration cannot adapt to an antenna array structure of the AAS. In addition, an existing system can only support a configuration of eight antenna ports at most. That is, the prior art cannot implement an adaptive configuration of an antenna array structure of the AAS, and cannot support a reference signal configuration of more than eight antenna ports.

SUMMARY

The present invention provides methods and apparatuses for receiving and sending a reference signal, user equipment, and a base station, so as to solve a problem, which is caused by a change of an antenna array structure and an increase of antenna ports, of sending and receiving a reference signal.

According to a first aspect, a method for receiving a reference signal is provided, including: receiving resource configuration information of a reference signal, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter; and receiving, according to the resource configuration information of the reference signal, the reference signal sent by a base station.

With reference to the first aspect, in a first implementation manner of the first aspect, information indicated by the antenna port configuration is a total quantity N of the antenna ports, where N is a multiple of n, and n is a predefined positive integer.

With reference to the first aspect, in a second implementation manner of the first aspect, information indicated by the antenna port configuration is an antenna port structure parameter m and the antenna port structure parameter n; or information indicated by the antenna port configuration is joint coding performed on an antenna port structure parameter m and the antenna port structure parameter n.

With reference to the first aspect or the implementation manners of the first aspect, in a third implementation manner of the first aspect, information indicated by the reference signal subframe configuration includes a subframe period and a subframe offset, where the subframe offset indicates one or more subframe positions for sending the reference signal in the subframe period.

With reference to the first aspect or the implementation manners of the first aspect, in a fourth implementation manner of the first aspect, an interval between the reference signal subframes is an integer multiple of 5, 10, 20, 40, or 80 subframes.

With reference to the first aspect or the implementation manners of the first aspect, in a fifth implementation manner of the first aspect, the resource configuration information of the reference signal further includes information about a reference signal configuration, where the reference signal configuration indicates a physical resource used by each antenna port when the reference signal is sent in each reference signal subframe in a reference signal subframe period.

With reference to the fifth implementation manner of the first aspect, in a sixth implementation manner of the first aspect, the reference signal configuration indicates different resource elements used by antenna ports, which have continuous indexes, used for sending the reference signal in different reference signal subframes in the reference signal subframe period.

According to a second aspect, a method for sending a reference signal is provided, including: sending resource configuration information of a reference signal to UE, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter; and sending the reference signal to the user equipment according to the resource configuration information of the reference signal.

With reference to the second aspect, in a first implementation manner of the second aspect, information indicated by the antenna port configuration is a total quantity N of the antenna ports, where N is a multiple of n, and n is a predefined positive integer.

With reference to the second aspect, in a second implementation manner of the second aspect, information indicated by the antenna port configuration is an antenna port structure parameter m and the antenna port structure parameter n; or information indicated by the antenna port configuration is joint coding performed on an antenna port structure parameter m and the antenna port structure parameter n.

With reference to the second aspect or the implementation manners of the second aspect, in a third implementation manner of the second aspect, information indicated by the reference signal subframe configuration includes a subframe period and a subframe offset, where the subframe offset indicates one or more subframe positions used by the reference signal in the subframe period.

With reference to the second aspect or the implementation manners of the second aspect, in a fourth implementation manner of the second aspect, an interval between the reference signal subframes is an integer multiple of 5, 10, 20, 40, or 80 subframes.

With reference to the second aspect or the implementation manners of the second aspect, in a fifth implementation manner of the second aspect, the resource configuration information of the reference signal further includes information about a reference signal configuration, where the reference signal configuration indicates a physical resource used by each antenna port when the reference signal is sent in each reference signal subframe in a reference signal subframe period.

With reference to the fifth implementation manner of the second aspect, in a sixth implementation manner of the second aspect, the reference signal configuration indicates different resource elements used by antenna ports, which have continuous indexes, used for sending the reference signal in different reference signal subframes in the reference signal subframe period.

According to a third aspect, an apparatus for receiving a reference signal is provided, including: a first receiving unit, configured to receive resource configuration information of a reference signal, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter; and a second receiving unit, configured to receive, according to the resource configuration information of the reference signal that is received by the first receiving unit, the reference signal sent by a base station.

With reference to the third aspect, in a first implementation manner of the third aspect, information indicated by the antenna port configuration is a total quantity N of the antenna ports, where N is a multiple of n, and n is a predefined positive integer.

With reference to the third aspect, in a second implementation manner of the third aspect, information indicated by the antenna port configuration is an antenna port structure parameter m and the antenna port structure parameter n; or information indicated by the antenna port configuration is joint coding performed on an antenna port structure parameter m and the antenna port structure parameter n.

With reference to the third aspect or the implementation manners of the third aspect, in a third implementation manner of the third aspect, information indicated by the reference signal subframe configuration includes a subframe period and a subframe offset, where the subframe offset indicates one or more subframe positions for sending the reference signal in the subframe period.

With reference to the third aspect or the implementation manners of the third aspect, in a fourth implementation manner of the third aspect, an interval between the reference signal subframes is an integer multiple of 5, 10, 20, 40, or 80 subframes.

With reference to the third aspect or the implementation manners of the third aspect, in a fifth implementation manner of the third aspect, the resource configuration information of the reference signal further includes information about a reference signal configuration, where the reference signal configuration indicates a physical resource used by each antenna port when the reference signal is sent in each reference signal subframe in a reference signal subframe period.

With reference to the fifth implementation manner of the third aspect, in a sixth implementation manner of the third aspect, the reference signal configuration indicates different resource elements used by antenna ports, which have continuous indexes, used for sending the reference signal in different reference signal subframes in the reference signal subframe period.

According to a fourth aspect, an apparatus for sending a reference signal is provided, including: a first sending unit, configured to send resource configuration information of a reference signal to user equipment, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter; and a second sending unit, configured to send the reference signal to the user equipment according to the resource configuration information of the reference signal that is sent by the first sending unit.

With reference to the fourth aspect, in a first implementation manner of the fourth aspect, information indicated by the antenna port configuration is a total quantity N of the antenna ports, where N is a multiple of n, and n is a predefined positive integer.

With reference to the fourth aspect, in a second implementation manner of the fourth aspect, information indicated by the antenna port configuration is an antenna port structure parameter m and the antenna port structure parameter n; or information indicated by the antenna port configuration is joint coding performed on an antenna port structure parameter m and the antenna port structure parameter n.

With reference to the fourth aspect or the implementation manners of the fourth aspect, in a third implementation manner of the fourth aspect, information indicated by the reference signal subframe configuration includes a subframe period and a subframe offset, where the subframe offset indicates one or more subframe positions for sending the reference signal in the subframe period.

With reference to the fourth aspect or the implementation manners of the fourth aspect, in a fourth implementation manner of the fourth aspect, an interval between the reference signal subframes is an integer multiple of 5, 10, 20, 40, or 80 subframes.

With reference to the fourth aspect or the implementation manners of the fourth aspect, in a fifth implementation manner of the fourth aspect, the resource configuration information of the reference signal further includes information about a reference signal configuration, where the reference signal configuration indicates a physical resource used by each antenna port when the reference signal is sent in each reference signal subframe in a reference signal subframe period.

With reference to the fifth implementation manner of the fourth aspect, in a sixth implementation manner of the fourth aspect, the reference signal configuration indicates different resource elements used by antenna ports, which have continuous indexes, used for sending the reference signal in different reference signal subframes in the reference signal subframe period.

According to a fifth aspect, user equipment is provided, including: a processor and a transceiver, where the transceiver is configured to receive resource configuration information of a reference signal under control of the processor, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter; and the transceiver is further configured to receive, according to the received resource configuration information of the reference signal, the reference signal sent by a base station.

According to a sixth aspect, a base station is provided, including: a processor, configured to determine resource configuration information of a reference signal, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter; and a transmitter, configured to send the resource configuration information of the reference signal and the reference signal to user equipment.

It can be seen that, in embodiments of the present invention, a reference signal is transmitted based on resource configuration information of the reference signal, which implements measurement on signal quality or channel state information. UE measures a channel based on a reference signal acquired from a base station and feeds back signal quality or channel state information, so that a communications system can adapt to an antenna array structure and more antenna port quantity configurations, which is used for cell selection or MCS selection and scheduling, thereby improving a system throughput.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM), a Code Division Multiple Access (CDMA) system, Wideband Code Division Multiple Access (WCDMA), a general packet radio service (GPRS), and LTE.

UE may also be referred to as a mobile terminal, a mobile station, and the like, may further include a relay, and may communicate with one or more core networks through a radio access network (RAN). The UE exchanges voice and/or data with the radio access network.

A base station may be a base station (BTS) in GSM or CDMA, may also be a base station (NodeB) in WCDMA, and may further be an evolved NodeB (eNB or e-NodeB, evolved Node B) in LTE. In addition, one base station may support/manage one or more cells (cell), and when the UE needs to communicate with a network, the UE selects one cell to initiate network access.

In the embodiments of the present invention, methods for sending and receiving a reference signal is provided for antenna configurations (especially antenna configurations of 8, 16, 32, 64 antenna ports and another quantity of antenna ports) of an AAS base station, where the reference signal may be used for measuring channel quality or channel state information, or may be used for coherent demodulation. UE measures a channel based on the reference signal and feeds back channel quality or channel state information, or performs PDSCH demodulation based on the reference signal, which can adapt to an antenna array structure and more antenna port quantity configurations, so as to perform cell selection or modulation and coding scheme (MCS) selection and resource scheduling, which can improve a system throughput. In addition, it should be noted that, when a new LTE R12 system is designed, it is also important to consider backward compatibility, for example, the LTE R12 system equipped with the AAS base station is required to ensure that legacy UE in LTE R8 to R11 can make access and perform normal communication, and especially to avoid interference to the legacy UE. In the embodiments of the present invention, a backward compatibility requirement of a system can be further met.

Figure 1:
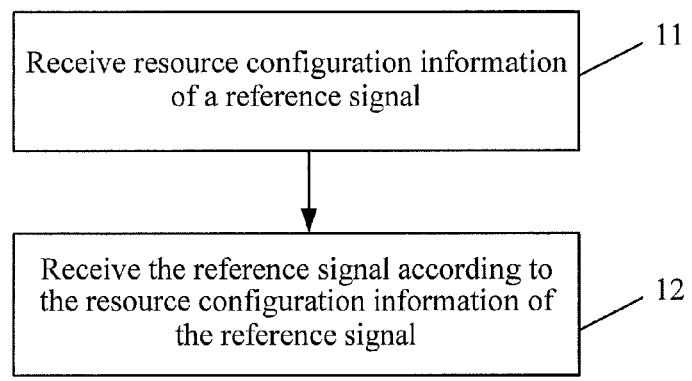
FIG. 1 is a flowchart of a method for receiving a reference signal according to an embodiment of the present invention.

A method for receiving a reference signal according to an embodiment of the present invention is described in detail below with reference to FIG. 1. For UE, a method for receiving a reference signal by the UE from a base station includes the following steps:

11: Receive resource configuration information of a reference signal, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter.

It should be noted that each antenna port is associated with or corresponds to one reference signal, and each antenna port is uniquely identified by a reference signal. The reference signal subframe refers to a subframe for sending a reference signal.

For example, the UE may receive the resource configuration information of the reference signal from the base station by using higher layer signaling or dynamic signaling, or the UE may receive, based on a cell identifier, the resource configuration information of the reference signal from the base station.

12: Receive the reference signal according to the resource configuration information of the reference signal.

It can be seen that, in this embodiment of the present invention, a reference signal is transmitted based on resource configuration information of the reference signal, which implements measurement on signal quality or channel state information. UE measures a channel based on a reference signal acquired from a base station and feeds back signal quality or channel state information, so that a communications system can adapt to an antenna array structure and more antenna port quantity configurations, which is used for cell selection or MCS selection and scheduling, thereby improving a system throughput.

According to this embodiment of the present invention, information indicated by the antenna port configuration may be a total quantity N of the antenna ports, where N is a multiple of n. In this case, the antenna port structure indicated by the antenna port configuration is determined by using a parameter N/n and the parameter n. In this case, the antenna port parameter n may be predefined, and is known by the UE and the base station. In addition, the antenna port parameter n may also be notified to the UE by broadcasting or multicasting. The antenna port structure parameter n may be a UE specific parameter, or may be a cell specific parameter.

Optionally, as another embodiment, information indicated by the antenna port configuration is a parameter m and the parameter n. In this case, the antenna port structure indicated by the antenna port configuration is determined by using the parameter m and the parameter n, for example, the antenna port structure is an antenna array having m rows and n columns.

In this way, the UE may obtain the antenna port structure according to the information about the antenna port configuration. The antenna port structure may be an antenna array structure or correspond to an antenna array structure.

Specifically, if the UE already learns that each antenna port group has n antenna ports, the UE can determine that there are N/n antenna port groups provided that the base station indicates, by using the antenna port configuration, to the UE that the total quantity of the antenna ports is N. Alternatively, the base station directly indicates, by using the antenna port configuration, a structure parameter m and a structure parameter n of an antenna port array to the UE, and in this case, the antenna port structure corresponds to the antenna array having m rows and n columns. Therefore, the UE may learn the antenna port structure or the antenna array structure according to the resource configuration information of the reference signal.

In addition, information indicated by the reference signal subframe configuration may include a subframe period and a subframe offset, where the subframe offset indicates one or more subframe positions for sending the reference signal in the subframe period. The subframe positions may be evenly distributed or distributed in an equal-length manner in one subframe period, and the subframe positions may also be configured, according to a requirement, to be unevenly distributed in one subframe period, so as to avoid interference to another configuration. Further, an interval between the reference signal subframes for sending the reference signal is an integer multiple of 5, 10, 20, 40, or 80 subframes.

Generally, the reference signal is sent on the one or more antenna port groups in each reference signal subframe, where each antenna port group includes the n antenna ports having continuous indexes, and n is the antenna port structure parameter.

n antenna ports having continuous indexes may correspond to one row of antenna ports in a horizontal direction in the antenna array structure or the antenna port structure, and existing LTE R8 to R11 systems may use the row of antenna ports in the horizontal direction in the antenna array structure or the antenna port structure, that is, antenna ports or reference signals of the existing LTE R8 to R11 systems may be subsets of LTE R12 configured with the AAS base station and a future system. The existing LTE R8 to R11 systems are mainly designed for an antenna array deployed in a horizontal direction, and therefore, the n antenna ports having continuous indexes may be compatible with an existing system, which ensures that UE of the existing system can perform normal access and communication.

A physical resource, such as a resource element (RE) in each physical resource block (PRB), occupied by the reference signal in each reference signal subframe may be predefined, and is known by the UE and the base station (such as an eNB).

In addition, the resource configuration information of the reference signal may further include information about a reference signal configuration, where the reference signal configuration may indicate a physical resource, such as an RE used by the reference signal in each PRB, used by each antenna port when the reference signal is sent in each reference signal subframe in a reference signal subframe period, which is not limited herein.

A reference signal configuration in each reference signal subframe in the reference signal subframe period may be the same. For example, a reference signal used by the n antenna ports having continuous indexes in one reference signal subframe in the reference signal subframe period and a reference signal used by the n antenna ports having continuous indexes in another reference signal subframe in the reference signal subframe period occupy a same position of a physical resource element RE.

It should be noted that, REs, which are indicated by the reference signal configuration, on different physical resource blocks PRBs in each reference signal subframe may have a same position in each PRB or may have different positions in each PRB. A position, of an RE corresponding to the reference signal configuration, in each PRB may use a position of an RE or a code resource used by a CSI RS of existing LTE-R10, and details are not provided herein again.

In step 12, the UE may obtain the antenna port configuration according to a resource configuration of the received reference signal; according to the antenna port structure parameter indicated by the antenna port configuration, for example, the total quantity N of the antenna ports or the structure parameter m and the structure parameter n, the UE may obtain the reference signal subframe configuration according to the resource configuration of the received reference signal, so as to learn the subframe period of the reference signal and the subframe offset of the reference signal subframe in the subframe period, and obtain a position of the reference signal subframe, and further, the UE may receive, in the reference signal subframe, the reference signal sent on the one or more antenna port groups, where each antenna port group includes the n antenna ports, and each reference signal corresponds to one antenna port.

In addition, the position of the physical resource (such as the RE used in the reference signal in each PRB) occupied by the reference signal in each reference signal subframe may be obtained according to a predefined physical resource known by the UE and the base station, or may be obtained according to the physical resource indicated by the reference signal configuration further included in the resource configuration of the reference signal. How to obtain a reference signal according to a position of an RE or a code resource is the prior art, and details are not provided herein again.

The UE may receive the reference signal according to the resource configuration information of the reference signal, and further, may perform channel estimation based on the received reference signal, for example, to obtain channel estimation corresponding to each antenna port by using a least square (LS) method or based on a minimum mean squared error (MMSE) criterion. Based on the channel estimation, the UE may determine channel state information and report the channel state information to the base station.

In addition, the UE may further obtain, based on the received reference signal, information about reference signal received quality in specified measurement bandwidth, such as reference signal received power (RSRP) or reference signal received quality (RSRQ). Obtaining the RSRP or the RSRQ based on the received reference signal is implemented by the prior art, and details are not provided herein again.

It can be seen that, in this embodiment of the present invention, an antenna port array structure may be acquired based on resource configuration information of a reference signal, and a reference signal sent on one or more n-port antenna port groups is received in the reference signal subframe based on the structure parameter, where indexes of antenna ports included in each antenna port group are continuous, so as to facilitate UE in implementing measurement on channel state information or measurement on signal received quality. In this solution, sending of the reference signal can adapt to an antenna array structure and more antenna port quantity configurations, which is used for cell selection or MCS selection and scheduling, thereby improving a system throughput. In addition, the continuous indexes of the antenna ports can meet a backward compatibility requirement of the system.

In a specific embodiment, the UE receives the resource configuration information of the reference signal, where the resource configuration information of the reference signal includes the information about the antenna port configuration and the reference signal subframe configuration. The antenna port configuration indicates the antenna port structure, and the reference signal subframe configuration indicates the reference signal subframe for sending the reference signal on the one or more antenna port groups, where each antenna port group includes the n antenna ports having continuous indexes. Then, the UE receives the reference signal sent by the base station, where the reference signal is obtained according to the resource configuration information of the reference signal.

Specifically, the UE may receive the resource configuration information, which is notified by an eNB, of the reference signal by using higher layer signaling (such as radio resource control (RRC) signaling) or dynamic signaling (such as downlink control information (DCI)); or the UE may obtain the resource configuration information of the reference signal based on a cell identifier (Cell ID).

One reference signal port always corresponds to one physical antenna or one virtual antenna, and the virtual antenna may be obtained by a weighted combination of multiple physical antennas. For an actual antenna configuration, there may be different antenna quantities, antenna array forms (antenna arrangement manners), antenna polarizations, and the like.

The information indicated by the antenna port configuration may be the total quantity N of the antenna ports, where N is a multiple of n. In this case, the antenna port structure indicated by the antenna port configuration is determined by using the parameter N/n and the parameter n. In this case, the antenna port parameter n may be predefined, for example, n=4, and is known by the UE and the base station.

Alternatively, the information indicated by the antenna port configuration may also be the parameter m and the parameter n. In this case, the antenna port structure indicated by the antenna port configuration is determined by using the parameter m and the parameter n, for example, the antenna port structure is the antenna array having m rows and n columns.

Figure 2:
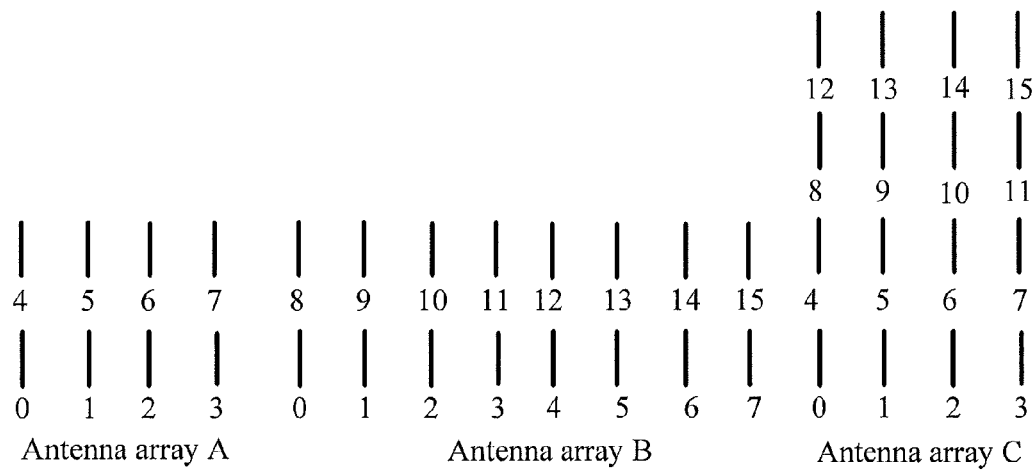
FIG. 2 shows a uniform linear array antenna array of an AAS base station.
Figure 3:
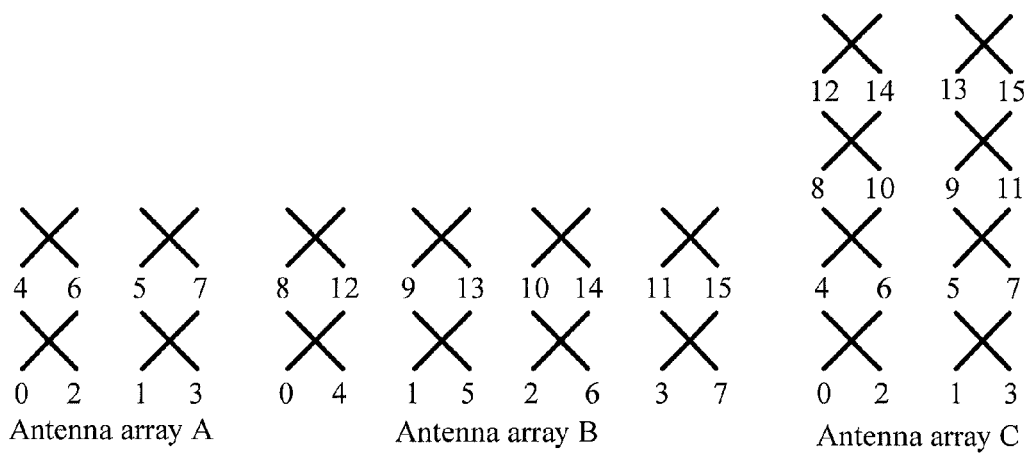
FIG. 3 shows a cross polarization antenna array of an AAS base station.

FIG. 2 and FIG. 3 separately show a uniform linear array antenna array and a cross polarization antenna array of an AAS base station.

Using uniform linear arrays in FIG. 2 as an example, indexes corresponding to antenna arrays A, B, and C are respectively (m, n)=(2, 4), (m, n)=(2, 8), and (m, n)=(4, 4).

Using cross polarization antenna arrays in FIG. 3 as an example, indexes corresponding to antenna arrays A, B, and C are respectively (m, n)=(2, 4), (m, n)=(2, 8), and (m, n)=(4, 4), where two groups of different polarization antennas may be located in positions in a same column. For example, using the antenna array A as an example, (0, 1, 4, 5) is a 45° polarized co-polarization antenna group, and (2, 3, 6, 7) is a −45° polarized co-polarization antenna group. 0 and 2, 1 and 3, 4 and 6, 5 and 7 are located in same positions, and therefore, antenna ports 0, 2, 4, and 6 are located in a same column, and antenna ports 1, 3, 5, and 7 are located in a same column. The foregoing rule is applicable to the antenna arrays B and C.

Further, the antenna port structure parameter (for example, the total quantity N of the antenna ports, the indexes m and n, or the quantity m of rows and the quantity n of columns of the antenna array) indicated by the antenna port configuration may use joint coding. For example, in the RRC signaling or DCI of the resource configuration information of the reference signal that is received by the UE, joint coding is separately performed on the quantity N of the antenna ports, the indexes m and n, or the quantity m of rows and the quantity n of columns of the antenna array, for example, m and n and corresponding values of joint coding that are shown in Table 1.

TABLE 1

Joint coding performed on indexes m and n

| Values of joint coding performed on m and n | Index or quantity m of rows of an antenna array | Index or quantity n of columns of an antenna array |
|---|---|---|
| 0 | 1 | 1 |
| 1 | 1 | 4 |
| 2 | 1 | 8 |
| 3 | 2 | 4 |
| 4 | 4 | 2 |
| 5 | 4 | 4 |
| 6 | 4 | 8 |
| 7 | 8 | 4 |
| 8 | 8 | 8 |

It should be noted that, in order to be backward compatible with an antenna port configured by a conventional or legacy base station (such as an eNB of LTE R8 to R10 systems), and for the antenna port configuration of the AAS base station, an antenna array of the conventional base station or the legacy base station should be used as a subset of the antenna port configuration of the AAS base station.

Figure 4:
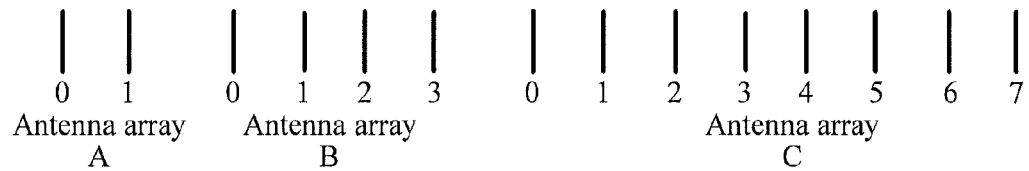
FIG. 4 shows a uniform linear array of a legacy base station.
Figure 5:
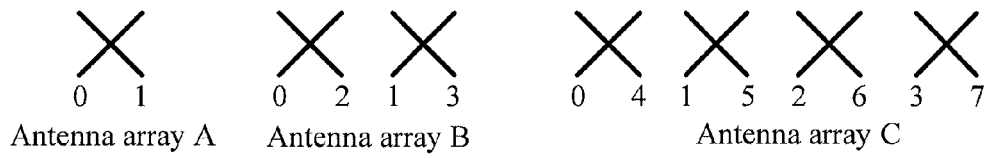
FIG. 5 shows a cross polarization linear array of a legacy base station.

FIG. 4 and FIG. 5 separately show a different uniform linear array and cross polarization antenna array of a legacy base station. For example, the antenna array A in FIG. 3 includes an antenna array B in FIG. 5. For another example, the antenna array B in FIG. 3 includes an antenna array C in FIG. 5. In this way, it can be ensured that UE of a conventional system (such as the LTE R8 to R10 systems) can access a system equipped with an AAS base station, and the system of the AAS base station ensures, by configuring a suitable antenna port, that legacy UE can normally work.

In addition, it should be noted that, a start point of numbers of antenna ports may be a fixed value x, for example, 0 to 7 or 0 to 15, and corresponding numbers are x+0, . . . , and x+7, or x+0, . . . , and x+15 successively. For example, x is equal to 15 or another value, and adjustment may be performed according to actual requirements, which is not limited herein. Specifically, using sixteen antennas as an example, it is assumed that corresponding reference signal ports are 15, 16, . . . , and 30 successively.

The information indicated by the reference signal subframe configuration may include the subframe period and the subframe offset, where the subframe offset indicates one or more subframe positions used by the reference signal in the subframe period. The subframe positions may be evenly distributed or distributed in an equal-length manner in one subframe period, and the subframe positions may also be configured, according to a requirement, to be unevenly distributed in one subframe period, so as to avoid interference to another configuration. Further, the interval between the subframes for sending the reference signal is an integer multiple of 5, 10, 20, 40, or 80 subframes.

For example, in the subframe period, there are in total two subframes used for sending the reference signal, where an n-port antenna port group in one subframe is (15, 16, . . . , 22), and an n-port antenna port group in the other subframe is (23, . . . , 30), where n=8.

Alternatively, in the subframe period, there are in total four subframes used for sending the reference signal, where n-port antenna port groups in the four different subframes are (15, . . . , 18), (19, . . . , 22), (23, . . . , 26), and (27, . . . , 30) respectively, where n=4.

Alternatively, in the subframe period, there are in total two subframes used for sending the reference signal, where two n-port antenna port groups in one subframe are (15, . . . , 18) and (23, . . . , 26) respectively, and two n-port antenna port groups in the other subframe are (19, . . . , 22) and (27, . . . , 30) respectively, where n=4.

By using the foregoing method, it may be further extended to a larger quantity of antenna ports. In addition, it can ensure that an existing system is backward compatible, such as an LTE-R10 system.

Further, the interval between the subframes for sending the reference signal is an integer multiple of 5, 10, 20, 40, or 80 subframes.

As described above, one or more reference signal port groups are sent in different subframes, and indexes of ports in the sent reference signal port groups are continuous, and in this way, not only a resource configuration of a reference signal of an existing system can be used to extend to more antenna ports, but also the system can be enabled to keep backward compatibility after the extension, so that UE of the existing system can normally work. In addition, the interval between the subframes for sending the reference signal is an integer multiple of 5, 10, 20, 40, or 80 subframes, which can enable the UE of the existing system to measure interference by using a position of a zero-power reference signal, so as to perform interference suppression, or perform rate matching by using a position of a zero-power reference signal, thereby avoiding severe interference caused to the legacy UE. It should be further noted that, division of the antenna port group is not limited to an antenna port group having four antenna ports, or may be an antenna port group having two or eight antenna ports or an antenna port group in another construction form. Besides, a quantity of antenna ports included in each antenna port group is not limited to the foregoing value, and may be flexibly selected according to an actual antenna configuration or deployment. A mapping of the predefined antenna port group and mapping indication information can enable the system to adapt to more antenna configurations and antenna array deployments.

Further, the UE receives, based on the resource configuration information of the reference signal, the reference signal sent by the base station. Specifically, the UE may obtain the information about the antenna port configuration according to the received resource configuration information of the reference signal, for example, as described above, obtain the quantity N of the antenna ports or obtain the indexes m and n or obtain the quantity m of rows and the quantity n of columns of the antenna array. Because the reference signal corresponds to the antenna port, it may be obtained that a quantity of reference signals is N or a product of m and n. The UE may obtain the information about the reference signal subframe configuration according to the resource configuration information of the received reference signal, where the information about the reference signal subframe configuration includes the subframe period and the subframe offset, where the subframe offset indicates one or more subframes occupied by the reference signal in the subframe period, so as to obtain a subframe position of the reference signal. The UE may obtain the information about the reference signal configuration according to the resource configuration information of the received reference signal, where the reference signal configuration may indicate the physical resource used by each antenna port when the reference signal is sent in each reference signal subframe in the reference signal subframe period, so that the reference signal can be obtained in the physical resource used by the antenna port. Specifically, the reference signal configuration may indicate different resource elements used by antenna ports, which have continuous indexes, used for sending the reference signal in different reference signal subframes in the reference signal subframe period.

Finally, based on the received reference signal, the UE may determine channel state information or information about signal received quality such as RSRP and RSRQ and report the channel state information or the information about the signal received quality to the base station.

To sum up, the present invention provides a design solution of a reference signal configuration for an antenna configuration of an AAS base station. For the reference signal configuration, one or more reference signal port groups are sent in different subframes, and indexes of ports in the sent reference signal port groups are continuous, and in this way, not only a resource configuration of a reference signal of an existing system can be used to extend to more antenna ports, but also the system can be enabled to keep backward compatibility after the extension, so that UE of the existing system can normally work. In addition, an interval between subframes for sending the reference signal is an integer multiple of 5, 10, 20, 40, or 80 subframes, which can enable the UE of the existing system to measure interference by using a position of a zero-power reference signal, so as to perform interference suppression, or perform rate matching by using a position of a zero-power reference signal, thereby avoiding severe interference caused to the legacy UE. The reference signal of the reference signal configuration may be used for measuring the channel state information, and the UE measures a channel based on the reference signal and feeds back the channel state information, so that the system can adapt to more antenna configurations and antenna array deployments, which is used for cell selection or MCS selection and scheduling, thereby improving a system throughput.

It is easy to understand that the reference signal and the resource configuration information of the reference signal may be from different base stations, for example, in a COMP scenario, one base station sends resource configuration information of a reference signal of all coordinated base stations, and the base stations each send an independent reference signal.

Figure 6:
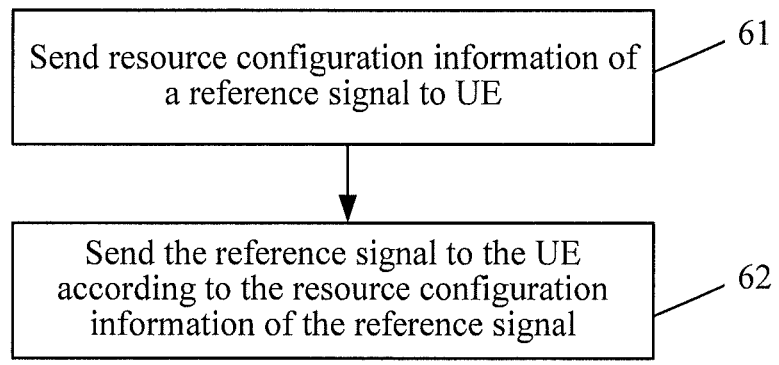
FIG. 6 is a flowchart of a method for sending a reference signal according to an embodiment of the present invention.

A method for sending a reference signal by a base station according to an embodiment of the present invention is described in detail below with reference to FIG. 6, and includes the following steps:

61: Send resource configuration information of a reference signal to UE, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter.

It should be noted that each antenna port is associated with or corresponds to one reference signal, and each antenna port is uniquely identified by a reference signal. The reference signal subframe refers to a subframe for sending a reference signal.

For example, the base station sends the resource configuration information of the reference signal to the UE by using higher layer signaling or dynamic signaling, or sends, based on a cell identifier, the resource configuration information of the reference signal to the UE.

Information indicated by the antenna port configuration may be a total quantity N of the antenna ports, where N is a multiple of n. In this case, the antenna port structure indicated by the antenna port configuration is determined by using a parameter N/n and the parameter n. In this case, the antenna port parameter n may be predefined, and is known by the UE and the base station. In addition, the antenna port parameter n may also be notified to the UE by broadcasting or multicasting. The antenna port structure parameter n may be a UE specific parameter, or may be a cell specific parameter.

Alternatively, information indicated by the antenna port configuration is a parameter m and the parameter n. In this case, the antenna port structure indicated by the antenna port configuration is determined by using the parameter m and the parameter n, for example, the antenna port structure is an antenna array having m rows and n columns.

Information indicated by the reference signal subframe configuration may include a subframe period and a subframe offset, where the subframe offset indicates one or more subframe positions for sending the reference signal in the subframe period. The subframe positions may be evenly distributed or distributed in an equal-length manner in one subframe period, and the subframe positions may also be configured, according to a requirement, to be unevenly distributed in one subframe period, so as to avoid interference to another configuration.

Further, an interval between the subframes for sending the reference signal is an integer multiple of 5, 10, 20, 40, or 80 subframes.

The reference signal is sent on the one or more antenna port groups in each reference signal subframe, where each antenna port group includes the n antenna ports having continuous indexes, and n is the antenna port structure parameter.

n antenna ports having continuous indexes may correspond to one row of antenna ports in a horizontal direction in the antenna array structure or the antenna port structure, and existing LTE R8 to R11 systems may use the row of antenna ports in the horizontal direction in the antenna array structure or the antenna port structure, that is, antenna ports or reference signals of the existing LTE R8 to R11 systems may be subsets of LTE R12 configured with an AAS base station and a future system. The existing LTE R8 to R11 systems are mainly designed for an antenna array deployed in a horizontal direction, and therefore, the n antenna ports having continuous indexes may be compatible with an existing system, which ensures that UE of the existing system can perform normal access and communication.

A position of a physical resource (such as an RE in each PRB) occupied by the reference signal in each reference signal subframe may be predefined, and is known by the UE and the base station (such as an eNB).

In addition, the resource configuration information of the reference signal may further include information about a reference signal configuration, where the reference signal configuration may indicate a physical resource, such as an RE used by the reference signal in each PRB, used by each antenna port when the reference signal is sent in each reference signal subframe in a reference signal subframe period, which is not limited herein.

Reference signal configurations in different reference signal subframes in the reference signal subframe period may be the same or different. For example, a reference signal used by the n antenna ports having continuous indexes in one reference signal subframe in the reference signal subframe period and a reference signal used by the n antenna ports having continuous indexes in another reference signal subframe in the reference signal subframe period occupy a same position or different positions of a physical resource element RE.

It should be noted that, REs, which are indicated by the reference signal configuration, on different physical resource blocks PRBs in each reference signal subframe may have a same position in each PRB or may have different positions in each PRB. A position, of an RE corresponding to the reference signal configuration, in each PRB may use a position of an RE or a code resource used by a CSI RS of existing LTE-R10, and details are not provided herein again.

In addition, it should be further noted that, before the resource configuration information of the reference signal is sent to the UE, it may be further included that the base station determines a resource configuration of the reference signal for the UE according to a capability of the UE, for example, some UEs have a capability of being only capable of processing eight antenna ports. In addition, the base station may further consider, according to a quantity of UEs in a serving cell, that different UEs use different antenna port groups or antenna port subsets.

62: A base station sends the reference signal to the UE according to the resource configuration information of the reference signal.

Therefore, the base station sends the reference signal to the UE according to the resource configuration information of the reference signal, so that the UE determines, based on the received reference signal, channel state information (such as a RI/PMI/CQI) or information about signal received quality (such as RSRP or RSRQ), and receive the channel state information or the signal received quality information sent by the UE.

It can be seen that, in this embodiment of the present invention, a reference signal is transmitted according to resource configuration information of the reference signal, UE may be notified of information about an antenna port array structure, and the reference signal is sent on one or more n-port antenna port groups in the reference signal subframe based on the structure parameter, where indexes of antenna ports included in each antenna port group are continuous, so as to facilitate the UE in implementing measurement on channel state information or measurement on signal received quality. In this solution, sending of the reference signal can adapt to an antenna array structure and more antenna port quantity configurations, which is used for cell selection or MCS selection and scheduling, thereby improving a system throughput. In addition, the continuous indexes of the antenna ports can meet a backward compatibility requirement of the system.

In a specific embodiment, the eNB sends the resource configuration information of the reference signal to the UE, where the resource configuration information of the reference signal includes the information about the antenna port configuration and the reference signal subframe configuration. The antenna port configuration indicates the antenna port structure, and the reference signal subframe configuration enables the reference signal to be sent on the one or more n-port antenna port groups in each reference signal subframe, where each antenna port group includes the n ports having continuous indexes. Then, the eNB sends the reference signal to the UE, where the reference signal is sent according to the resource configuration information of the reference signal.

Specifically, the eNB may send the resource configuration information of the reference signal to the UE by using higher layer signaling (such as RRC signaling) or dynamic signaling (such as DCI), or the eNB may send the resource configuration information of the reference signal based on a cell identifier.

Specifically, the information indicated by the antenna port configuration may be the quantity N of the antenna ports, where N is a multiple of n. In this case, the antenna port structure indicated by the antenna port configuration is determined by using the parameter N/n and the parameter n. In this case, the antenna port parameter n may be predefined, for example, n=4, and is known by the UE and the base station.

Alternatively, the information indicated by the antenna port configuration may also be the parameter m and the parameter n, where a product of m and n is the quantity N of the antenna ports. Further, indexes m and n respectively correspond to a quantity of rows and a quantity of columns of an antenna array.

Further, the antenna port structure parameter (for example, the total quantity N of the antenna ports, the indexes m and n, or the quantity m of rows and the quantity n of columns of the antenna array) indicated by the antenna port configuration may use joint coding in signaling of the resource configuration information of the reference signal that is sent by the eNB. For example, the eNB may send the resource configuration information of the reference signal by using the RRC signaling or DCI, and the included antenna port configuration is joint coding performed on the parameter m and the parameter n, or the quantity m of rows and the quantity n of columns of the antenna array.

It should be noted that, in order to be backward compatible with an antenna port configured by a conventional or legacy base station (such as an eNB of LTE R8 to R10 systems), and for the antenna port of the AAS base station, an antenna array of the conventional base station or the legacy base station should be used as a subset of the antenna port of the AAS base station.

In addition, it should be noted that, a start point of numbers of antenna ports may be a fixed value x, for example, when x=15, sixteen antennas are used as an example, and corresponding antenna ports are 15, 16, . . . , and 30 successively.

The information indicated by the reference signal subframe configuration may include the subframe period and the subframe offset, where the subframe offset indicates one or more subframe positions for sending the reference signal in the subframe period, the subframe positions may be evenly distributed or distributed in an equal-length manner in one subframe period, and the subframe positions may also be configured, according to a requirement, to be unevenly distributed in one subframe period, so as to avoid interference to another configuration. Further, the interval between the subframes for sending the reference signal is an integer multiple of 5, 10, 20, 40, or 80 subframes.

For example, in the subframe period, there are in total two subframes used for sending the reference signal, where an n-port antenna port group in one subframe is (15, 16, 22), and an n-port antenna port group in the other subframe is (23, . . . , 30), where n=8.

Alternatively, in the subframe period, there are in total four subframes used for sending the reference signal, where n-port antenna port groups in the four different subframes are (15, . . . , 18), (19, . . . , 22), (23, . . . , 26), and (27, . . . , 30) respectively, where n=4.

Alternatively, in the subframe period, there are in total two subframes used for sending the reference signal, where two n-port antenna port groups in one subframe are (15, . . . , 18) and (23, . . . , 26) respectively, and two n-port antenna port groups in the other subframe are (19, . . . , 22) and (27, . . . , 30) respectively, where n=4.

By using the foregoing method, it may be further extended to a larger quantity of antenna ports. In addition, it can ensure that an existing system is backward compatible, such as an LTE-R10 system.

In the foregoing embodiments, a resource used by a reference signal port in each subframe in which there is a reference signal includes a resource element RE, an OFDM symbol, or a code resource, which may be a resource element RE, an OFDM symbol, or a code resource used by a reference signal corresponding to an n-port configuration of a CSI RS of LTE R10, or may be a resource element RE, an OFDM symbol, or a code resource used by a reference signal corresponding to another n-port configuration, which is not limited herein.

In addition, for different subframes, different antenna port groups may use a same resource or different resources. Further, the interval between the subframes for sending the reference signal is an integer multiple of 5, 10, 20, 40, or 80 subframes.

As described above, one or more reference signal port groups are sent in different subframes, and indexes of ports in the sent reference signal port groups are continuous, and in this way, not only a resource configuration of a reference signal of an existing system can be used to extend to more antenna ports, but also the system can be enabled to keep backward compatibility after the extension, so that UE of the existing system can normally work. In addition, the interval between the subframes for sending the reference signal is an integer multiple of 5, 10, 20, 40, or 80 subframes, which can enable the UE of the existing system to measure interference by using a position of a zero-power reference signal, so as to perform interference suppression, or perform rate matching by using a position of a zero-power reference signal, thereby avoiding severe interference caused to the legacy UE. It should be further noted that, division of the antenna port group is not limited to an antenna port group having four antenna ports, or may be an antenna port group having two or eight antenna ports or an antenna port group in another construction form. Besides, a quantity of antenna ports included in each antenna port group is not limited to the foregoing value, and may be flexibly selected according to an actual antenna configuration or deployment. A mapping of the predefined antenna port group and mapping indication information can enable the system to adapt to more antenna configurations and antenna array deployments.

The eNB sends the reference signal to the UE according to the resource configuration information of the reference signal.

Specifically, the eNB sends the reference signal on the one or more n-port antenna port groups according to the resource configuration information, which includes the antenna port structure indicated by the antenna port configuration and the reference signal subframe indicated by the reference signal subframe configuration, of the reference signal to be sent.

As described above, the total quantity N of the antenna ports is determined, the indexes m and n are determined, or the quantity m of rows and the quantity n of columns of the antenna array are obtained. Because a reference signal corresponds to an antenna port, it may be determined that a quantity of reference signals is N or a product of m and n. The eNB determines the information about the reference signal subframe configuration according to the resource configuration information of the reference signal, where the information about the reference signal subframe configuration includes the subframe period and the subframe offset, where the subframe offset indicates one or more subframes for sending the reference signal in the subframe period, so as to determine a subframe position of the reference signal. In addition, the eNB may further determine the information about the reference signal configuration according to the resource configuration information of the reference signal, where the reference signal configuration may indicate the physical resource used by each antenna port when the reference signal is sent in each reference signal subframe in the reference signal subframe period, so that the reference signal can be sent in a resource used by a reference signal port.

Finally, the eNB receives channel state information (such as CSI) or information about signal received quality (such as RSRP or RSRQ) reported by the UE, where the channel state information or the information about the signal received quality is obtained based on the reference signal.

To sum up, this embodiment of the present invention provides a solution for configuring and sending a reference signal for an antenna configuration of an AAS base station.

In this solution, the reference signal may be configured based on an antenna port array structure, and the reference signal is sent on one or more n-port antenna port groups in the reference signal subframe based on the structure parameter, where indexes of antenna ports included in each antenna port group are continuous, and in this way, not only a resource configuration of a reference signal of an existing system can be used to extend to more antenna ports, but also the system can be enabled to keep backward compatibility after the extension, so that UE of the existing system can normally work. In addition, an interval between subframes for sending the reference signal is an integer multiple of 5, 10, 20, 40, or 80 subframes, which can enable the UE of the existing system to measure interference by using a position of a zero-power reference signal, so as to perform interference suppression, or perform rate matching by using a position of a zero-power reference signal, thereby avoiding severe interference caused to the legacy UE. The reference signal of a reference signal configuration may be used for measuring channel state information or measures signal received quality. The UE measures a channel based on the reference signal, and feeds back the channel state information or the signal received quality, so that the system can adapt to more antenna configurations and antenna array deployments, which is used for cell selection or MCS selection and scheduling, thereby improving a system throughput.

Figure 7:
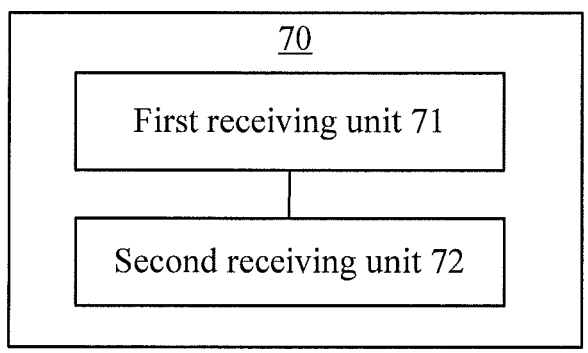
FIG. 7 is a schematic structural diagram of an apparatus for receiving a reference signal according to an embodiment of the present invention.

An apparatus for receiving a reference signal according to an embodiment of the present invention is described in detail below with reference to FIG. 7. As shown in FIG. 7, an apparatus 70 for receiving a reference signal includes a first receiving unit 71 and a second receiving unit 72. The first receiving unit 71 is configured to receive resource configuration information of a reference signal, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter. The second receiving unit 72 is configured to receive, according to the resource configuration information of the reference signal that is received by the first receiving unit 71, the reference signal sent by a base station.

The first receiving unit 71 may be configured to receive the resource configuration information of the reference signal from the base station by using higher layer signaling or dynamic signaling, or receive, based on a cell identifier, the resource configuration information of the reference signal from the base station.

Information indicated by the antenna port configuration may be a total quantity N of the antenna ports, where N is a multiple of n. In this case, the antenna port structure indicated by the antenna port configuration is determined by using a parameter N/n and the parameter n. In this case, the antenna port parameter n may be predefined, and is known by UE and the base station. In addition, the antenna port parameter n may also be notified to the UE by broadcasting or multicasting. The antenna port structure parameter n may be a UE specific parameter, or may be a cell specific parameter.

Alternatively, information indicated by the antenna port configuration is a parameter m and the parameter n. In this case, the antenna port structure indicated by the antenna port configuration is determined by using the parameter m and the parameter n, for example, in this case, the antenna port structure is an antenna array having m rows and n columns.

Information indicated by the reference signal subframe configuration may include a subframe period and a subframe offset, where the subframe offset indicates one or more subframe positions for sending the reference signal in the subframe period. The subframe positions may be evenly distributed or distributed in an equal-length manner in one subframe period, and the subframe positions may also be configured, according to a requirement, to be unevenly distributed in one subframe period, so as to avoid interference to another configuration. Further, an interval between the reference signal subframes is an integer multiple of 5, 10, 20, 40, or 80 subframes.

Generally, the reference signal is sent on the one or more antenna port groups in each reference signal subframe, where each antenna port group includes the n antenna ports having continuous indexes, and n is the antenna port structure parameter.

n antenna ports having continuous indexes may correspond to one row of antenna ports in a horizontal direction in an antenna array structure or an antenna port structure, and existing LTE R8 to R11 systems may use the row of antenna ports in the horizontal direction in the antenna array structure or the antenna port structure, that is, antenna ports or reference signals of the existing LTE R8 to R11 systems may be subsets of LTE R12 configured with an AAS base station and a future system. The existing LTE R8 to R11 systems are mainly designed for an antenna array deployed in a horizontal direction, and therefore, the n antenna ports having continuous indexes may be compatible with an existing system, which ensures that UE of the existing system can perform normal access and communication.

A physical resource, such as an RE in each PRB, occupied by the reference signal in each reference signal subframe may be predefined, and is known by the UE and the base station.

In addition, the resource configuration information of the reference signal may further include information about a reference signal configuration, where the reference signal configuration may indicate a physical resource, such as an RE used by the reference signal in each PRB, used by each antenna port when the reference signal is sent in each reference signal subframe in a reference signal subframe period, which is not limited herein.

A reference signal configuration in each reference signal subframe in the reference signal subframe period may be the same. For example, a reference signal used by the n antenna ports having continuous indexes in one reference signal subframe in the reference signal subframe period and a reference signal used by the n antenna ports having continuous indexes in another reference signal subframe in the reference signal subframe period occupy a same position of a physical resource element RE.

It should be noted that, REs, which are indicated by the reference signal configuration, on different physical resource blocks PRBs in each reference signal subframe may have a same position in each PRB or may have different positions in each PRB. A position, of an RE corresponding to the reference signal configuration, in each PRB may use a position of an RE or a code resource used by a CSI RS of existing LTE-R10, and details are not provided herein again.

It can be seen that, in this embodiment of the present invention, an antenna port array structure may be acquired based on resource configuration information of a reference signal, and a reference signal sent on one or more n-port antenna port groups is received in the reference signal subframe based on the structure parameter, where indexes of antenna ports included in each antenna port group are continuous, so as to facilitate UE in implementing measurement on channel state information or measurement on signal received quality. In this solution, sending of the reference signal can adapt to an antenna array structure and more antenna port quantity configurations, which is used for cell selection or MCS selection and scheduling, thereby improving a system throughput. In addition, the continuous indexes of the antenna ports can meet a backward compatibility requirement of the system.

Figure 8:
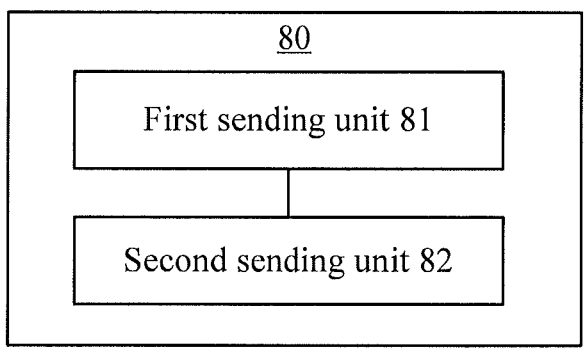
FIG. 8 is a schematic structural diagram of an apparatus for sending a reference signal according to an embodiment of the present invention.

An apparatus for sending a reference signal according to an embodiment of the present invention is described in detail below with reference to FIG. 8. As shown in FIG. 8, an apparatus 80 for sending a reference signal includes a first sending unit 81 and a second sending unit 82. The first sending unit 81 is configured to send resource configuration information of a reference signal to UE, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter. The second sending unit 82 is configured to send the reference signal to the UE according to the resource configuration information of the reference signal that is sent by the first sending unit 81.

It should be noted that each antenna port is associated with or corresponds to one reference signal, and each antenna port is uniquely identified by a reference signal. The reference signal subframe refers to a subframe for sending a reference signal.

Specifically, the first sending unit 81 is configured to send the resource configuration information of the reference signal to the UE by using higher layer signaling or dynamic signaling, or send, based on a cell identifier, the resource configuration information of the reference signal to the UE.

Information indicated by the antenna port configuration may be a total quantity N of the antenna ports, where N is a multiple of n. In this case, the antenna port structure indicated by the antenna port configuration is determined by using a parameter N/n and the parameter n. The antenna port parameter n may be predefined, and is known by the UE and a base station. In addition, the antenna port parameter n may also be notified to the UE by broadcasting or multicasting. The antenna port structure parameter n may be a LIE specific parameter, or may be a cell specific parameter.

Alternatively, information indicated by the antenna port configuration is a parameter m and the parameter n. In this case, the antenna port structure indicated by the antenna port configuration is determined by using the parameter m and the parameter n, for example, the antenna port structure is an antenna array having m rows and n columns.

Information indicated by the reference signal subframe configuration may include a subframe period and a subframe offset, where the subframe offset indicates one or more subframe positions for sending the reference signal in the subframe period. The subframe positions may be evenly distributed or distributed in an equal-length manner in one subframe period, and the subframe positions may also be configured, according to a requirement, to be unevenly distributed in one subframe period, so as to avoid interference to another configuration. Further, an interval between the reference signal subframes is an integer multiple of 5, 10, 20, 40, or 80 subframes.

The reference signal is sent on the one or more antenna port groups in each reference signal subframe, where each antenna port group includes the n antenna ports having continuous indexes, and n is the antenna port structure parameter.

n antenna ports having continuous indexes may correspond to one row of antenna ports in a horizontal direction in an antenna array structure or an antenna port structure, and existing LTE R8 to R11 systems may use the row of antenna ports in the horizontal direction in the antenna array structure or the antenna port structure, that is, antenna ports or reference signals of the existing LTE R8 to R11 systems may be subsets of LTE R12 configured with an AAS base station and a future system. The existing LTE R8 to R11 systems are mainly designed for an antenna array deployed in a horizontal direction, and therefore, the n antenna ports having continuous indexes may be compatible with an existing system, which ensures that UE of the existing system can perform normal access and communication.

A position of a physical resource (such as an RE in each PRB) occupied by the reference signal in each reference signal subframe may be predefined, and is known by the UE and the base station or an eNB.

In addition, the resource configuration information of the reference signal may further include information about a reference signal configuration, where the reference signal configuration may indicate a physical resource, such as an RE used by the reference signal in each PRB, used by each antenna port when the reference signal is sent in each reference signal subframe in a reference signal subframe period, which is not limited herein.

A reference signal configuration in each reference signal subframe in the reference signal subframe period may be the same. For example, a reference signal used by the n antenna ports having continuous indexes in one reference signal subframe in the reference signal subframe period and a reference signal used by the n antenna ports having continuous indexes in another reference signal subframe in the reference signal subframe period occupy a same position of a physical resource element RE.

It should be noted that, REs, which are indicated by the reference signal configuration, on different physical resource blocks PRBs in each reference signal subframe may have a same position in each PRB or may have different positions in each PRB. A position, of an RE corresponding to the reference signal configuration, in each PRB may use a position of an RE or a code resource used by a CSI RS of existing LTE-R10, and details are not provided herein again.

In addition, it should be further noted that, before the resource configuration information of the reference signal is sent to the UE, it may be further included that the base station determines a resource configuration of the reference signal for the UE according to a capability of the UE, for example, some UEs have a capability of being only capable of processing 8 antenna ports. In addition, the base station may further consider, according to a quantity of UEs in a serving cell, that different UEs use different antenna port groups or antenna port subsets.

It can be seen that, in this embodiment of the present invention, a reference signal is transmitted according to resource configuration information of the reference signal, UE may be notified of information about an antenna port array structure, and the reference signal is sent on one or more n-port antenna port groups in the reference signal subframe based on the structure parameter, where indexes of antenna ports included in each antenna port group are continuous, so as to facilitate the UE in implementing measurement on channel state information or measurement on signal received quality. In this solution, sending of the reference signal can adapt to an antenna array structure and more antenna port quantity configurations, which is used for cell selection or MCS selection and scheduling, thereby improving a system throughput. In addition, the continuous indexes of the antenna ports can meet a backward compatibility requirement of the system.

Figure 9:
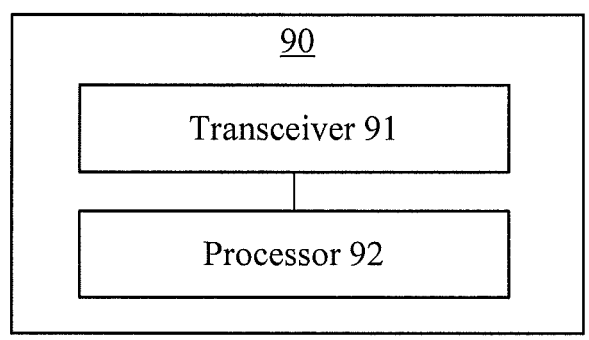
FIG. 9 is a schematic structural diagram of user equipment according to an embodiment of the present invention.

FIG. 9 shows user equipment 90 according to an embodiment of the present invention. The user equipment 90 includes a transceiver 91 and a processor 92, where the transceiver 91 is configured to receive resource configuration information of a reference signal from a base station under control of the processor 92, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter; and is further configured to receive the reference signal from the base station according to the received resource configuration information of the reference signal.

It can be seen that, in this embodiment of the present invention, an antenna port array structure may be acquired based on resource configuration information of a reference signal, and a reference signal sent on one or more n-port antenna port groups is received in the reference signal subframe based on the structure parameter, where indexes of antenna ports included in each antenna port group are continuous, so as to facilitate UE in implementing measurement on channel state information or measurement on signal received quality. In this solution, sending of the reference signal can adapt to an antenna array structure and more antenna port quantity configurations, which is used for cell selection or MCS selection and scheduling, thereby improving a system throughput, and meeting a backward compatibility requirement of the system.

Figure 10:
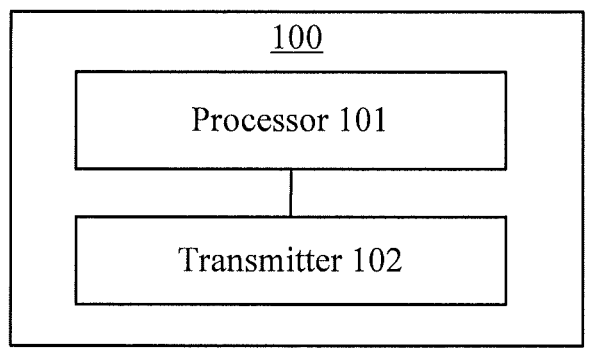
FIG. 10 is a schematic structural diagram of a base station according to an embodiment of the present invention.

FIG. 10 shows a base station 100 according to an embodiment of the present invention. The base station 100 includes a processor 101 and a transmitter 102. The processor 101 is configured to determine resource configuration information of a reference signal, where the resource configuration information of the reference signal includes information about an antenna port configuration and a reference signal subframe configuration, the antenna port configuration indicates an antenna port structure, the reference signal subframe configuration indicates a reference signal subframe for sending the reference signal on one or more antenna port groups, and each antenna port group includes n antenna ports having continuous indexes, where n is an antenna port structure parameter. The transmitter 102 is configured to send the resource configuration information of the reference signal and the reference signal to UE.

It can be seen that, in this embodiment of the present invention, a reference signal is transmitted according to resource configuration information of the reference signal, an antenna port array structure may be indicated, and the reference signal is sent on one or more n-port antenna port groups in the reference signal subframe based on the structure parameter, where indexes of antenna ports included in each antenna port group are continuous, so as to facilitate UE in implementing measurement on channel state information or measurement on signal received quality. In this solution, sending of the reference signal can adapt to an antenna array structure and more antenna port quantity configurations, which is used for cell selection or MCS selection and scheduling, thereby improving a system throughput, and meeting a backward compatibility requirement of the system.

It should be understood that, a solution described in each claim of the present invention shall also be considered as an embodiment, and features in the claims can be combined, for example, the performed steps in different branches after the determining steps in the present invention can be used as different embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not provided herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of receiving a reference signal, comprising:
receiving resource configuration information of a reference signal, wherein the resource configuration information of the reference signal comprises information about an antenna port configuration and a reference signal subframe configuration, the antenna port configuration indicates an antenna port structure, the reference signal subframe configuration indicates a reference signal subframe for sending the reference signal on one or more antenna port groups, each of the antenna port groups comprises n antenna ports having continuous indexes, each of the continuous indexes corresponding to one row of the n antenna ports in a horizontal direction, wherein n is an antenna port structure parameter, and each of the n antenna ports is associated with one reference signal; and
receiving the reference signal according to the resource configuration information of the reference signal,
wherein the resource configuration information of the reference signal further comprises information about a reference signal configuration, wherein the reference signal configuration indicates a physical resource used by each of the antenna ports when the reference signal is sent in each reference signal subframe in a reference signal subframe period, and
wherein the reference signal configuration indicates different resource elements used by antenna ports, which have continuous indexes, used for sending the reference signal in different reference signal subframes in the reference signal subframe period.

2. The method according to claim 1, wherein information indicated by the antenna port configuration is a total quantity N of the antenna ports, wherein N is a multiple of n, and n is a predefined positive integer.

3. The method according to claim 1, wherein
information indicated by the antenna port configuration is an antenna port structure parameter m and the antenna port structure parameter n; or
information indicated by the antenna port configuration is joint coding performed on an antenna port structure parameter m and the antenna port structure parameter n.

4. The method according to claim 1, wherein information indicated by the reference signal subframe configuration comprises a subframe period and a subframe offset, wherein the subframe offset indicates one or more subframe positions for sending the reference signal in the subframe period.

5. The method according to claim 1, wherein an interval between the reference signal subframes is an integer multiple of 5, 10, 20, 40, or 80 subframes.

6. A method of sending a reference signal, comprising:
sending resource configuration information of a reference signal to user equipment, wherein the resource configuration information of the reference signal comprises information about an antenna port configuration and a reference signal subframe configuration, the antenna port configuration indicates an antenna port structure, the reference signal subframe configuration indicates a reference signal subframe for sending the reference signal on one or more antenna port groups, each of the antenna port groups comprises n antenna ports having continuous indexes, each of the continuous indexes corresponding to one row of the n antenna ports in a horizontal direction, wherein n is an antenna port structure parameter, and each of the n antenna ports is associated with one reference signal; and
sending the reference signal to the user equipment according to the resource configuration information of the reference signal,
wherein the resource configuration information of the reference signal further comprises information about a reference signal configuration, wherein the reference signal configuration indicates a physical resource used by each of the antenna ports when the reference signal is sent in each reference signal subframe in a reference signal subframe period, and
wherein the reference signal configuration indicates different resource elements used by antenna ports, which have continuous indexes, used for sending the reference signal in different reference signal subframes in the reference signal subframe period.

7. The method according to claim 6, wherein information indicated by the antenna port configuration is a total quantity N of the antenna ports, wherein N is a multiple of n, and n is a predefined positive integer.

8. The method according to claim 6, wherein
information indicated by the antenna port configuration is an antenna port structure parameter m and the antenna port structure parameter n; or
information indicated by the antenna port configuration is joint coding performed on an antenna port structure parameter m and the antenna port structure parameter n.

9. The method according to claim 6, wherein information indicated by the reference signal subframe configuration comprises a subframe period and a subframe offset, wherein the subframe offset indicates one or more subframe positions used by the reference signal in the subframe period.

10. The method according to claim 6, wherein an interval between the reference signal subframes is an integer multiple of 5, 10, 20, 40, or 80 subframes.

11. An apparatus for receiving a reference signal, comprising:
a first receiving unit, configured to receive resource configuration information of a reference signal, wherein the resource configuration information of the reference signal comprises information about an antenna port configuration and a reference signal subframe configuration, the antenna port configuration indicates an antenna port structure, the reference signal subframe configuration indicates a reference signal subframe for sending the reference signal on one or more antenna port groups, each of the antenna port groups comprises n antenna ports having continuous indexes, each of the continuous indexes corresponding to one row of the n antenna ports in a horizontal direction, wherein n is an antenna port structure parameter, and each of the n antenna ports is associated with one reference signal; and
a second receiving unit, configured to receive, according to the resource configuration information of the reference signal that is received by the first receiving unit, the reference signal sent by a base station, wherein the resource configuration information of the reference signal further comprises information about a reference signal configuration, wherein the reference signal configuration indicates a physical resource used by each of the antenna ports when the reference signal is sent in each reference signal subframe in a reference signal subframe period, and wherein the reference signal configuration indicates different resource elements used by antenna ports, which have continuous indexes, used for sending the reference signal in different reference signal subframes in the reference signal subframe period.

12. The apparatus according to claim 11, wherein information indicated by the antenna port configuration is a total quantity N of the antenna ports, wherein N is a multiple of n, and n is a predefined positive integer.

13. The apparatus according to claim 11, wherein
information indicated by the antenna port configuration is an antenna port structure parameter m and the antenna port structure parameter n; or
information indicated by the antenna port configuration is joint coding performed on an antenna port structure parameter m and the antenna port structure parameter n.

14. The apparatus according to claim 11, wherein information indicated by the reference signal subframe configuration comprises a subframe period and a subframe offset, wherein the subframe offset indicates one or more subframe positions used by the reference signal in the subframe period.

15. The apparatus according to claim 11, wherein an interval between the reference signal subframes is an integer multiple of 5, 10, 20, 40, or 80 subframes.

16. An apparatus for receiving a reference signal, comprising:

a first receiver configured to receive resource configuration information of a reference signal, wherein the resource configuration information of the reference signal comprises information about an antenna port configuration and a reference signal subframe configuration, the antenna port configuration indicates an antenna port structure, the reference signal subframe configuration indicates a reference signal subframe for sending the reference signal on one or more antenna port groups, each of the antenna port groups comprises n antenna ports having continuous indexes, each of the continuous indexes corresponding to one row of the n antenna ports in a horizontal direction, wherein n is an antenna port structure parameter, and each of the n antenna ports is associated with one reference signal; and a second receiver configured to receive, according to the resource configuration information of the reference signal that is received by the first receiver, the reference signal sent by a base station.

* * * * *